## (12) United States Patent
Pietron et al.

(10) Patent No.: US 9,074,953 B2
(45) Date of Patent: Jul. 7, 2015

(54) SENSOR PACKAGING AT OUTPUT SIDE OF FRONT WHEEL DRIVE (FWD) TRANSMISSIONS

(71) Applicant: Ford Global Technologies, LLC, Dearborn, MI (US)

(72) Inventors: Gregory Michael Pietron, Canton, MI (US); Nimrod Kapas, Canton, MI (US); Yuji Fujii, Ann Arbor, MI (US); Joseph F. Kucharski, Livonia, MI (US); Gregory Daniel Goleski, Rochester Hills, MI (US); Jeffrey Edward Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 13/872,244

(22) Filed: Apr. 29, 2013

(65) Prior Publication Data

US 2014/0318272 A1   Oct. 30, 2014

(51) Int. Cl.
*G01L 3/10*   (2006.01)

(52) U.S. Cl.
CPC ..................... *G01L 3/103* (2013.01)

(58) Field of Classification Search
CPC ......... G01L 3/102; G01L 3/104; G01L 1/125; G01L 25/003; G01L 3/1435; G01L 3/103
USPC ....................................... 73/115.02, 862.335
See application file for complete search history.

(56) References Cited

U.S. PATENT DOCUMENTS

| | | | | |
|---|---|---|---|---|
| 4,004,474 A * | 1/1977 | Moore | ............................. | 74/411 |
| 4,055,080 A * | 10/1977 | Farr et al. | .................... | 73/862.21 |
| 4,282,776 A * | 8/1981 | Eller | ............................. | 475/149 |
| 4,697,460 A * | 10/1987 | Sugiyama et al. | ........ | 73/862.333 |
| 4,887,461 A * | 12/1989 | Sugimoto et al. | .......... | 73/115.02 |
| 4,934,501 A * | 6/1990 | Gay et al. | .................... | 192/70.27 |
| 5,067,350 A * | 11/1991 | Grillo et al. | ..................... | 73/494 |
| 5,067,355 A * | 11/1991 | Witte | ....................... | 73/862.326 |
| 5,157,966 A * | 10/1992 | Lugosi et al. | ............... | 73/115.02 |
| 6,846,260 B2 * | 1/2005 | Horiuchi | ........................ | 475/125 |
| 7,285,949 B2 * | 10/2007 | Burns et al. | .................... | 324/173 |
| 7,579,827 B2 * | 8/2009 | Burns et al. | .................... | 324/173 |
| 8,215,188 B2 * | 7/2012 | Klimenko et al. | ........ | 73/862.328 |
| 8,424,393 B1 * | 4/2013 | Lee | ........................... | 73/862.335 |
| 8,568,099 B2 * | 10/2013 | Sabannavar et al. | ....... | 416/170 R |
| 8,622,869 B2 * | 1/2014 | Mourani | ....................... | 475/332 |
| 8,635,917 B2 * | 1/2014 | Lee | ........................... | 73/862.335 |
| 8,844,379 B2 * | 9/2014 | Pietron et al. | ............. | 73/862.193 |
| 2003/0109346 A1 * | 6/2003 | Horiuchi | ......................... | 475/60 |

(Continued)

FOREIGN PATENT DOCUMENTS

JP    2003278876 A   10/2003

*Primary Examiner* — Freddie Kirkland, III
(74) *Attorney, Agent, or Firm* — James Dottavio; Brooks Kushman P.C.

(57) ABSTRACT

Various packaging designs for placement of a magnetic torque sensor at the output shaft of a front wheel drive transmission are provided. One design provides for mounting a sensor on a chain drive sprocket or integrating a sensor into a modified sprocket bearing mount. Another design provides for mounting a sensor at the grounded ring gear of a final planetary drive. Another design provides for mounting a sensor at the differential housing. Another design provides for mounting a sensor at the output planetary carrier hub/park gear. Another design provides for mounting a sensor at a multi-piece transfer gear face.

5 Claims, 11 Drawing Sheets

(56) References Cited

U.S. PATENT DOCUMENTS

| | | |
|---|---|---|
| 2004/0031332 A1 | 2/2004 | May |
| 2005/0282678 A1 | 12/2005 | Mundis |
| 2007/0068235 A1 | 3/2007 | Bunyer et al. |
| 2007/0129207 A1* | 6/2007 | Kanamori ............... 475/331 |
| 2007/0220960 A1 | 9/2007 | JaVaherian |
| 2010/0200325 A1 | 8/2010 | Marsh et al. |
| 2012/0297895 A1* | 11/2012 | Kapas et al. ............ 73/862.193 |
| 2013/0091960 A1* | 4/2013 | Lee ........................ 73/862.335 |
| 2013/0263654 A1* | 10/2013 | Pietron et al. ............ 73/115.02 |

* cited by examiner (Background)

(Background)

(Background)

(Background)

(Background)

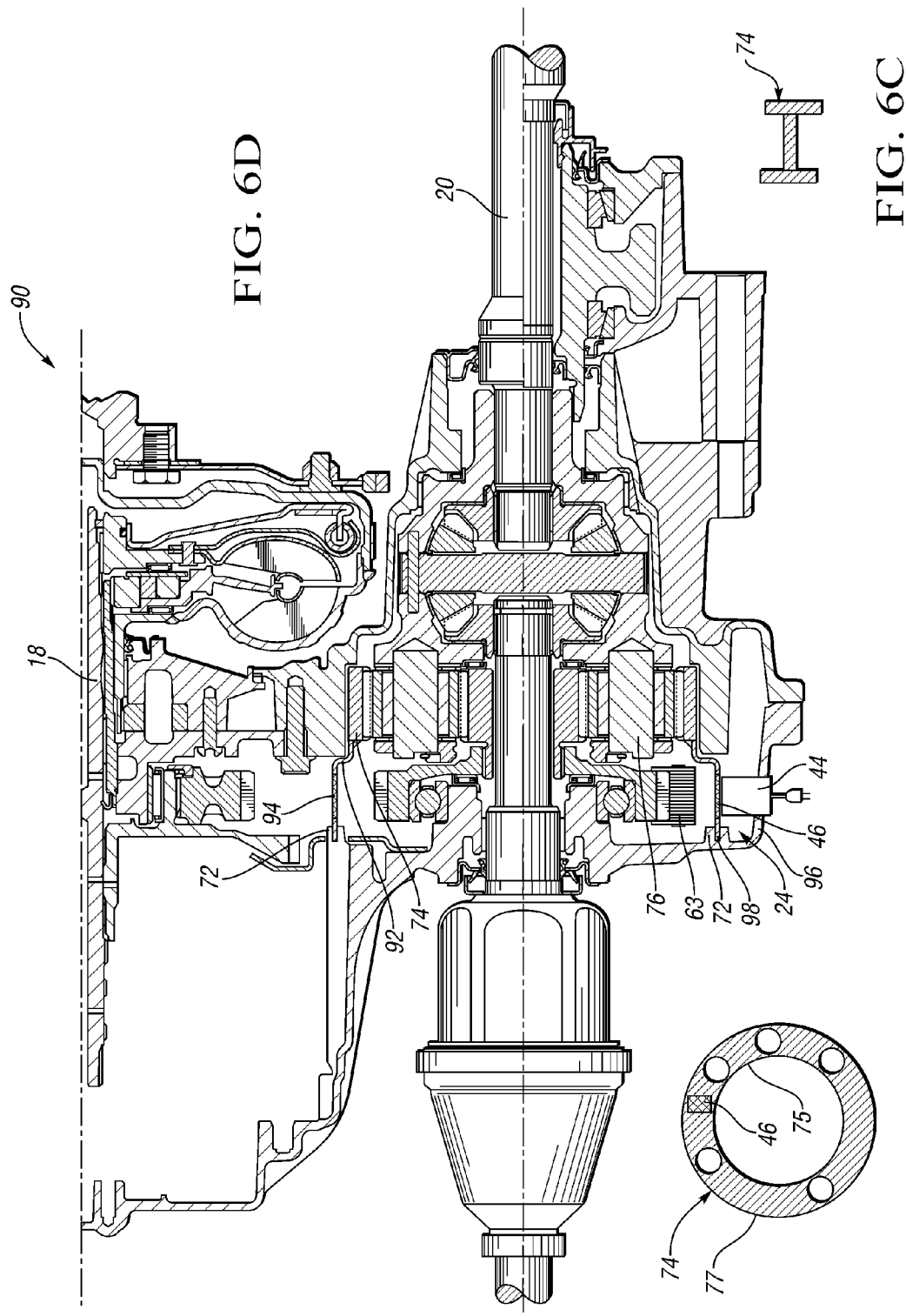

SENSOR PACKAGING AT OUTPUT SIDE OF FRONT WHEEL DRIVE (FWD) TRANSMISSIONS

TECHNICAL FIELD

The present invention relates to automatic transmissions having magnetic sensors.

BACKGROUND

An automatic transmission of a vehicle includes an input shaft and an output shaft. The input shaft receives an input torque at an input speed from power derived from a power source such as an engine. The transmission converts the input torque at the input speed to an output torque at an output speed. The output shaft transmits the output torque at the output speed to traction wheels of the vehicle in order to propel the vehicle.

The transmission converts the input torque at the input speed to the output torque at the output speed by adjusting a gear ratio (for example, during an up-shift or down-shift) between the input and output shafts. The transmission shifting is accomplished by applying and/or releasing friction elements (such as clutches, band-brakes, etc.) to change speed and torque relationships by altering planetary gear configurations of the transmission. As a result, power flow paths are established and disestablished from the engine to the wheels.

The friction elements have to be properly controlled in order to satisfactorily shift the transmission. To this end, information regarding the operation of the transmission is used to control the friction elements. For instance, information indicative of the output torque transmitted by the output shaft and the speed of the output shaft may be used.

Torque and speed of the output shaft are typically estimated based on various type of available information. One way to avoid estimation is to use a magnetic sensor mounted within the transmission to directly detect the torque and/or speed parameters. However, installation and packaging of such magnetic sensors within limited spaces of the transmission provides challenges.

SUMMARY

Embodiments of the present invention are directed to designs for packaging magnetic torque and/or speed sensors at the output side of front wheel drive (FWD) transmissions for volume production.

In one embodiment, the present invention provides a transmission including a chain drive sprocket, a pump housing, and a magnetic torque sensor. The chain drive sprocket is for driving an output shaft and has a magnetized region. The sensor, for detecting torque of the chain drive sprocket, is mounted to a portion of the pump housing facing the magnetized region.

In one embodiment, the present invention provides a transmission including a chain driven sprocket, a sprocket bearing support, and a magnetic torque sensor. The chain driven sprocket is for driving an output shaft and has a sprocket hub with a magnetized region. The sensor, for detecting torque of the sprocket hub, is mounted to a portion of the sprocket bearing support facing the magnetized region.

In one embodiment, the present invention provides a transmission including a final planetary drive, a fixed housing part, and a magnetic torque sensor. The final planetary drive is for driving an output shaft and has a ring gear. A ground location of the ring gear is configured such that a ground path includes a magnetized region. The sensor is mounted to a portion of the housing part facing the magnetized region. In one variation, the ring gear has a radial plate connected thereto, the ring gear includes the magnetized region, and the sensor senses the magnetized region to detect torque of the radial plate of the ring gear. In another variation, the ring gear includes a cylindrical shell connected thereto, the cylindrical shell includes the magnetized region and is configured to enable a chain drive to pass therethrough, and the sensor senses the magnetized region to detect torque of the cylindrical shell of the ring gear.

In one embodiment, the present invention provides a transmission including a unitary assembly having a differential housing and a final drive output gear for driving an output shaft. The final drive output gear has a magnetized region. The transmission further includes a magnetic torque sensor. The sensor, for detecting torque of the final drive output gear, is mounted to a portion of a fixed housing part of the transmission facing the magnetized region.

In one embodiment, the present invention provides a transmission including a final planetary drive, a pinion, a differential housing, a fixed housing part, and a magnetic torque sensor. The differential housing is for driving an output shaft and has a torque path portion between a differential input load location of the final planetary drive and a load at the pinion. The torque path portion having a magnetized region. The sensor, for detecting torque of the torque path portion, is mounted to a portion of the housing part facing the magnetized region.

In one embodiment, the present invention provides a transmission including an output planetary, a pump housing, and a magnetic torque sensor. The output planetary has a carrier hub. The carrier hub has a magnetized region between a load input and a load output of the carrier hub. The sensor, for detecting torque of the carrier hub, is mounted to a portion of the pump housing facing the magnetized region.

In one embodiment, the present invention provides a transmission including a transfer shaft, a transfer gear face, a fixed housing part, and a magnetic torque sensor. The transfer gear face includes an outer gear and an inner gear interconnected together. The outer gear has gear teeth on an outer diameter and the inner gear splined to the transfer shaft at an inner diameter of the inner gear. The inner gear has a magnetized region. The sensor, for detecting torque of the transfer shaft, is mounted in a portion of the housing part facing the magnetized region.

BRIEF DESCRIPTION OF THE DRAWINGS

FIGS. 6B and 6C respectively illustrate cross-sectional and radial-sectional views of a modified version of the ring gear of the final planetary drive in accordance with the second embodiment of the present invention;

FIG. 6D illustrates a cross-sectional view of an automatic transmission having a sensor at the grounded ring gear of a final planetary drive design (axial configuration) in accordance with a second variation of the second embodiment of the present invention;

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
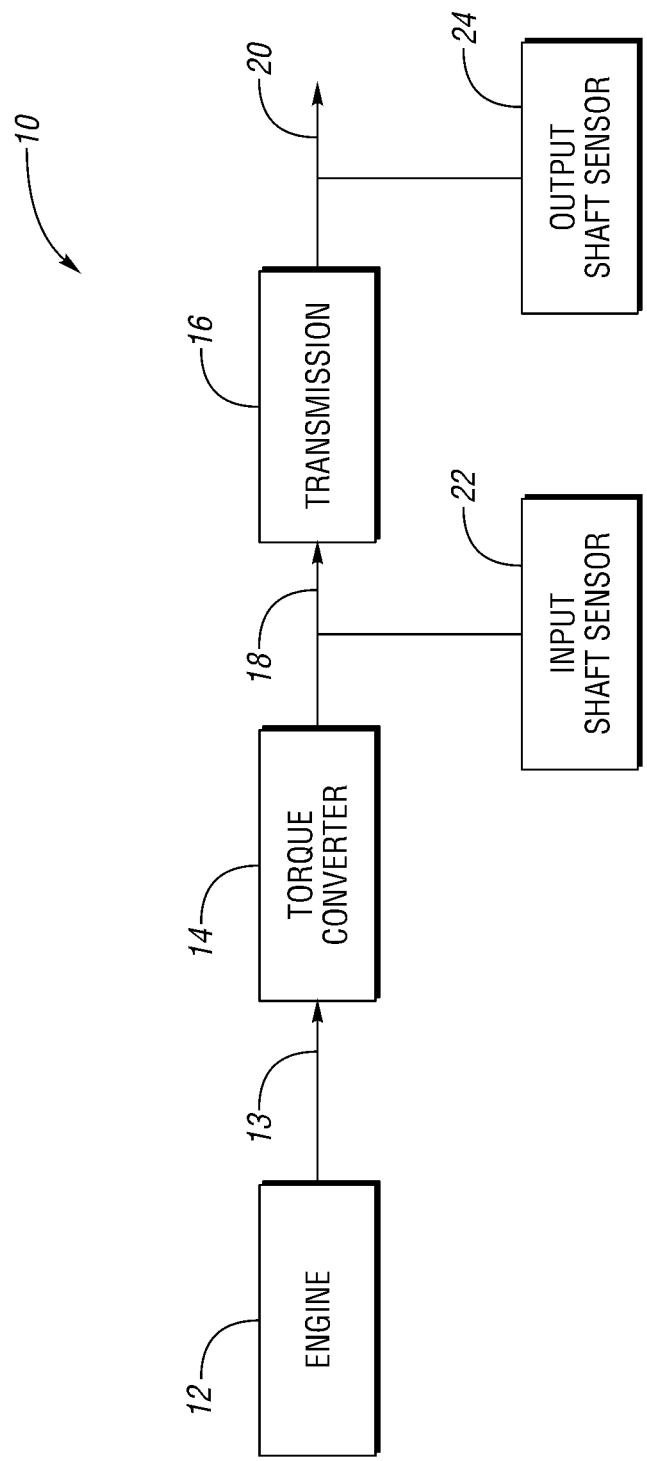
FIG. 1 illustrates a block diagram of a vehicle powertrain in accordance with embodiments of the present invention.

Referring now to FIG. 1, a block diagram of a vehicle powertrain 10 in accordance with embodiments of the present invention is shown. Powertrain 10 includes an engine 12, a torque converter 14, and an automatic transmission 16. Transmission 16 has an input shaft 18 and an output shaft 20. Engine 12 delivers torque to torque converter 14 via crankshaft 13 of engine 12 which is connected to torque converter 14. Torque converter 14 converts the engine torque into an input torque at an input speed and transmits the input torque at the input speed to input shaft 18 of transmission 16. Transmission 16 serves to change a transmission ratio and thus changes the input torque at the input speed into an output torque (for example, increased torque) at an output speed (for example, reduced speed). Transmission 16 transmits the output torque at the output speed to output shaft 20. Output shaft 20 is connected to a vehicle driveline (not shown) such that the output torque at the output speed may be used to drive wheels of the vehicle.

While not shown herein, embodiments of the present invention can be used as well in a hybrid powertrain that includes, for example, an engine and an electric motor without a torque converter.

Powertrain 10 further includes an output shaft sensor 24. Output shaft sensor 24 is associated with output shaft 20 and is configured to monitor at least one of (output) torque and (output) speed of output shaft 20. Sensor 24 provides sensor signals indicative of the monitored information to a controller via wiring (not shown) for the controller to control operation of transmission 16 accordingly.

Powertrain 10 may further include an input shaft sensor 22. Input shaft sensor 22 is associated with input shaft 18 and is configured to monitor at least one of (input) torque and (input) speed of input shaft 18. Sensor 22 provides sensor signals indicative of the monitored information to a controller (not shown) for the controller to control operation of transmission 16 accordingly.

Figure 2:
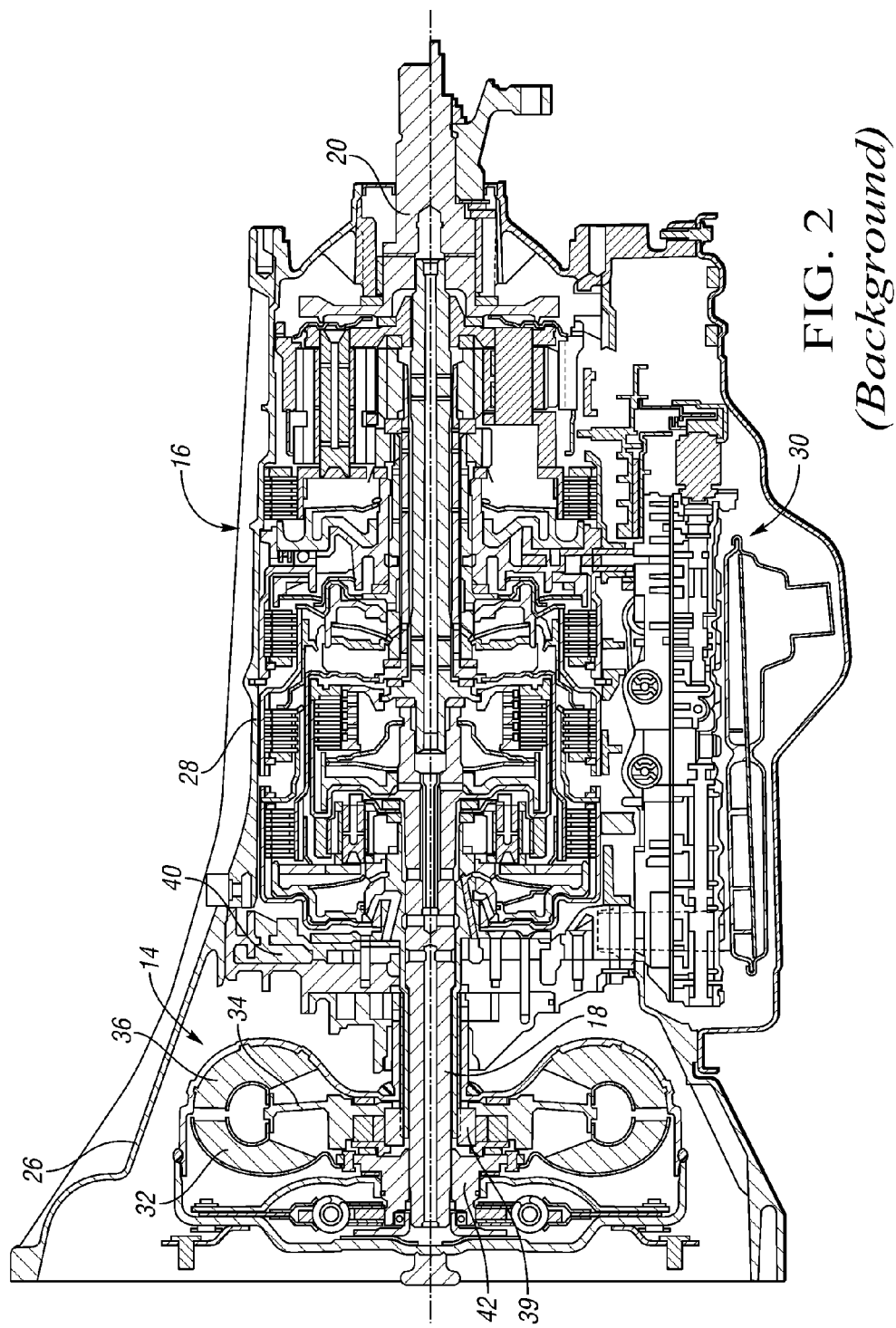
FIG. 2 illustrates a cross-sectional view of the torque converter and the transmission of the powertrain shown in FIG. 1 in which the transmission lacks an output shaft sensor.

Referring now to FIG. 2, with continual reference to FIG. 1, a cross-sectional view of torque converter 14 and transmission 16 is shown. As shown in FIG. 2, torque converter 14 is encased within a torque converter case 26 and transmission 16 is encased within a transmission case 28.

Transmission mechanism 30 changes the input torque at the input speed received by input shaft 18 into an output torque at an output speed transmitted by output shaft 20. As illustrated in the right-hand side of FIG. 2, transmission mechanism 30 uses planetary gear sets. Embodiments of the present invention may be applied to other types of transmission mechanisms including, but not limited to, belt-drive transmissions, dual clutch transmissions, or continuously variable transmissions.

Torque converter 14 includes a turbine 32, a stator 34, and an impeller 36. Impeller 36 is fixedly connected to engine crankshaft 13 such that impeller 36 rotates as crankshaft 13 rotates. Stator 34 is fixed onto the stator shaft (i.e., the stator tube) of a stator support 40 via a one-way clutch 39. Stator support 40 is fixed to transmission case 28. Turbine 32 is mechanically linked via a turbine hub 42 to input shaft 18.

Notably, transmission 16, as shown in FIG. 2, does not have an output shaft sensor 24 for directly measuring torque and/or speed of output shaft 20.

In accordance with embodiments of the present invention, a transmission is configured with inventive design concepts and features for enabling the packaging of an output shaft sensor 24 within the transmission in which sensor 24 is a magnetic sensor. The packaging of an output shaft sensor 24 within a transmission in accordance with embodiments of the present invention enables direct measurement of torque and/or speed of output shaft 20.

In some embodiments, sensor 24 is a magnetic torque sensor for monitoring torque of output shaft 20. Similarly, in some embodiments, sensor 24 is a magnetic speed sensor for monitoring speed of output shaft 20. Further, in some embodiments, sensor 24 is a magnetic torque and speed sensor for monitoring torque and speed of output shaft 20.

Magnetic torque and speed sensor technology operates optimally with a free smooth surface area on a shaft with constant diameter and controlled hardness, wherein a part of the shaft is magnetized. The magnetic sensor technology makes use of magnetic flux sensing elements such as fluxgate sensors. The sensing elements are preferably stationary and fixed with respect to the rotating magnetized surface of the shaft. Translation of the shaft in either the axial or radial direction relative to the sensor housing is preferably minimized. As indicated above, conventional transmission designs, such as shown in FIG. 2, represent challenges for packaging of magnetic sensors.

Sensor 24 may be a magneto-elastic sensor as described in U.S. Pat. Nos. 6,145,387; 6,047,605; 6,553,847; and 6,490,934. Other magnetic sensors may also be used to enable accurate measurements of torque exerted onto a rotating shaft and rotating speed of the shaft without physical contact between a magnetic flux sensing element of the sensor and the shaft.

Figure 3A:
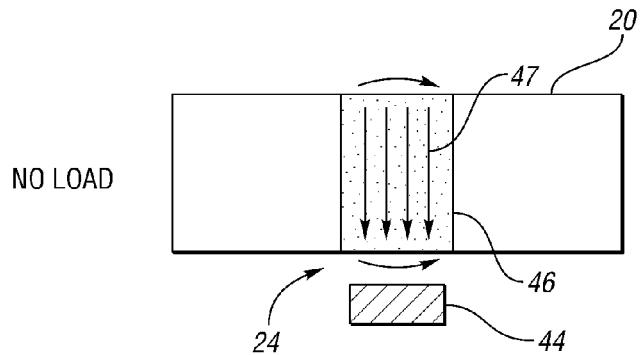
FIGS. 3A, 3B, and 3C illustrate an example of a magnetic torque sensor for detecting torque of a shaft.
Figure 3B:
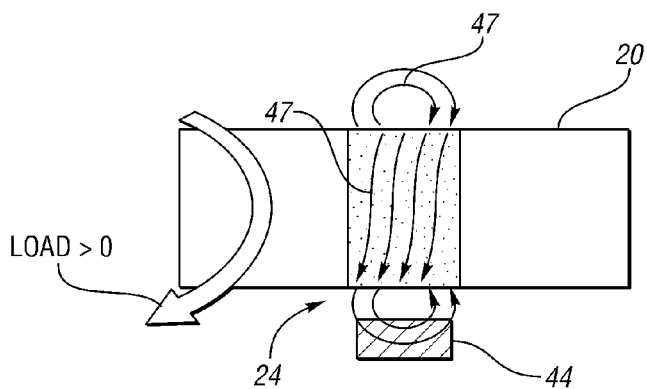
Figure 3C:
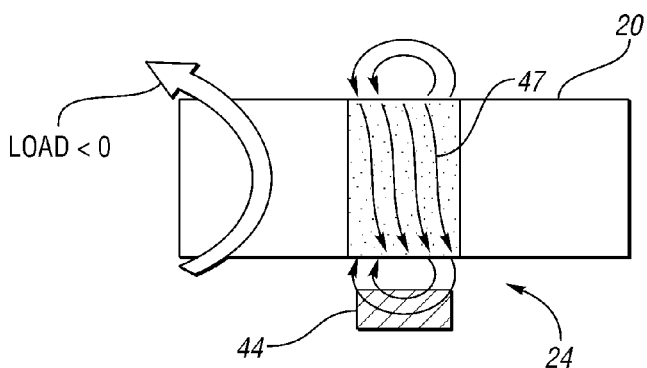

Referring now to FIGS. 3A, 3B, and 3C, an example of a magnetic torque sensor for detecting torque of a shaft will be described. This example assumes that the shaft is output shaft 20 and that the magnetic torque sensor is output shaft sensor 24.

Output shaft sensor 24 includes a magnetic flux sensing element(s) within a sensor housing 44. Output shaft 20 includes a magnetized region 46. Magnetized region 46 circumferentially extends around shaft 20. Magnetized region 46 may be created by coating magnetized material as a thin layer on a chosen region of shaft 20 or by magnetizing a region on the shaft. Sensor housing 44 is fixed in position adjacent to the magnetized region 46 of shaft 20 to enable the sensing element to sense the torque induced signal.

Preferably, output shaft 20 is made of steel having high Nickel content, preferably with Martensite structure at the surface layer. Shaft 20 is hardened to enable permanent magnetization. The chosen magnetized region 46 of shaft 20 is magnetized with magnetized material thereon to a designed depth from the surface within the hardened layer. A magnetic pattern or polarity signature may depend on a certain implementation of magneto-elastic torque sensing principles. However, they require a magnetized region 46 of shaft 20 and a sensor housing 44 that contains one or more magnetic flux sensing elements. Sensor housing 44 may include other types of sensing elements such as thermo-couples.

At no load (FIG. 3A), magnetic flux 47 is contained near or within the shaft surface. The illustration in FIG. 3A shows a simplified view of flux direction. Depending on chosen magnetization patterns, magnetic flux may have more complex directional patterns.

When load is applied (i.e., output shaft 20 is twisted), magnetic flux 47 extends from the shaft surface and its axial component which is proportional to the applied torque is measured by the sensing element (FIGS. 3B and 3C). For instance, as shown in FIGS. 3B and 3C, magnetic flux 47 is realigned in one direction when the load is greater than zero and is realigned in the opposite direction when the load is less than zero. Either realignment causes more magnetic flux 47 to come out from the shaft surface in proportion to the load level. As indicated in FIGS. 3B and 3C, the sensing element detects the magnetic flux direction and intensity. Variations of this technology may include, for example, dual band and tri-band magneto-elastic torque sensors.

Figure 4:
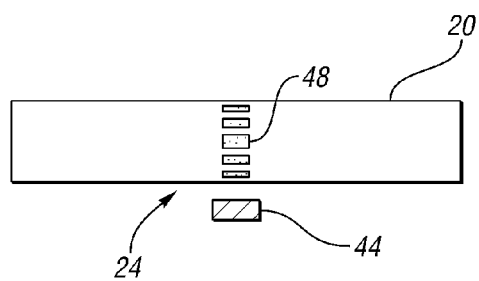
FIG. 4 illustrates an example of a magnetic speed sensor for detecting rotating speed of a shaft.

Referring now to FIG. 4, an example of a magnetic speed sensor for detecting rotating speed of a shaft will be described. Again, this example assumes that the shaft is output shaft 20 and that the magnetic speed sensor is output shaft sensor 24. Sensor 24 includes sensor housing 44 having magnetic flux sensing element(s). Shaft 20 includes a magnetized region 48 comprised of magnetic material placed in spots repeatedly around the circumference of the shaft as shown in FIG. 4. Sensor housing 44 is placed near the shaft surface, picking up the circumferential component of magnetic flux. A periodic voltage signal is generated on a magnetic spot as the rotating shaft 20 passes by the sensing element. The periodic voltage signal can be converted into a square wave signal using a comparator circuit which can then be converted into rpm by counting the number of square wave periods. Variations of this technology may include, for example, single band and dual band speed sensors.

For simplicity, a magnetic torque and/or speed sensor is referred to herein as a "magnetic torque sensor" or simply "sensor". However, as described above, such a magnetic torque sensor or sensor may be a magnetic torque sensor only, a magnetic speed sensor only, or a magnetic torque and speed sensor.

With the foregoing description in mind, various embodiments of the present invention will now be described.

In general, embodiments of the present invention provide various locations and packaging designs for placement of a magnetic torque and/or speed sensor ("sensor" or "output sensor") at the output shaft of a FWD transmission. These locations and packaging designs can be organized into different embodiments as follows.

A first embodiment provides mounting a sensor on a chain drive sprocket or integrating a sensor into a modified sprocket bearing mount. Thus, in one variation a sensor is mounted on a drive sprocket and in another variation a sensor is mounted on a driven sprocket.

A second embodiment provides mounting a sensor at the grounded ring gear of a final planetary drive. One variation employs a radial sensor configuration whereas another variation employs an axial sensor configuration.

A third embodiment provides mounting a sensor at the differential housing. In one variation, the sensor is on the face of the final drive output gear (final drive with idler shaft configuration). In another variation, the sensor is at a radial area after the final planetary drive (final drive with chain and final planetary drive configuration).

A fourth embodiment provides mounting a sensor at the output planetary carrier hub/park gear. A fifth embodiment provides mounting a sensor at a multi-piece transfer gear face.

Figure 5A:
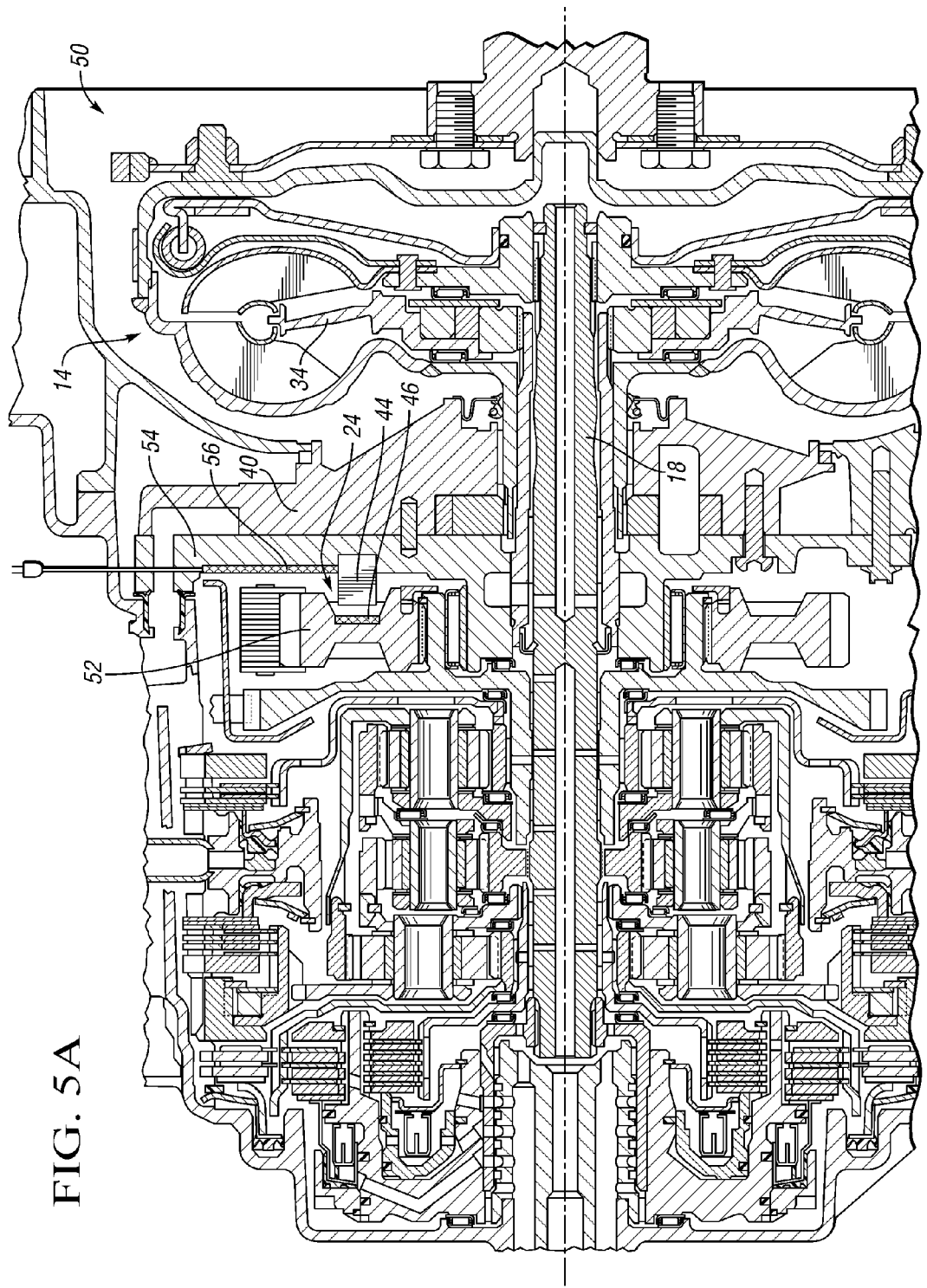
FIG. 5A illustrates a cross-sectional view of an automatic transmission having a sensor on chain drive sprocket design in accordance with a first variation of a first embodiment of the present invention.

Referring now to FIG. 5A, a cross-sectional view of an automatic transmission 50 having a sensor on chain drive sprocket design in accordance with a first variation of a first embodiment of the present invention is shown. In transmission 50, stator assembly 40 is made of a stator support and a stator tube which press-fit together to form stator assembly 40. The assembled stator assembly 40 is interconnected with a pump housing 54 by bolts. Transmission 50 includes a chain drive sprocket 52 for driving output shaft 20 of transmission 50. Chain drive sprocket 52 includes a magnetized region 46 of a sensor 24. Magnetized region 46 is on an outer surface of chain drive sprocket 52 facing pump housing 54. Sensor housing 44 of sensor 24 is integrated into the portion of pump housing 54 facing magnetized region 46 of chain drive sprocket 52. The magnetic flux sensing element(s) within sensor housing 44 senses magnetized region 46 to thereby read the tangential stress on the surface of chain drive sprocket 52. Wiring 56 of sensor 24 is embedded through pump housing 54.

Figure 5B:
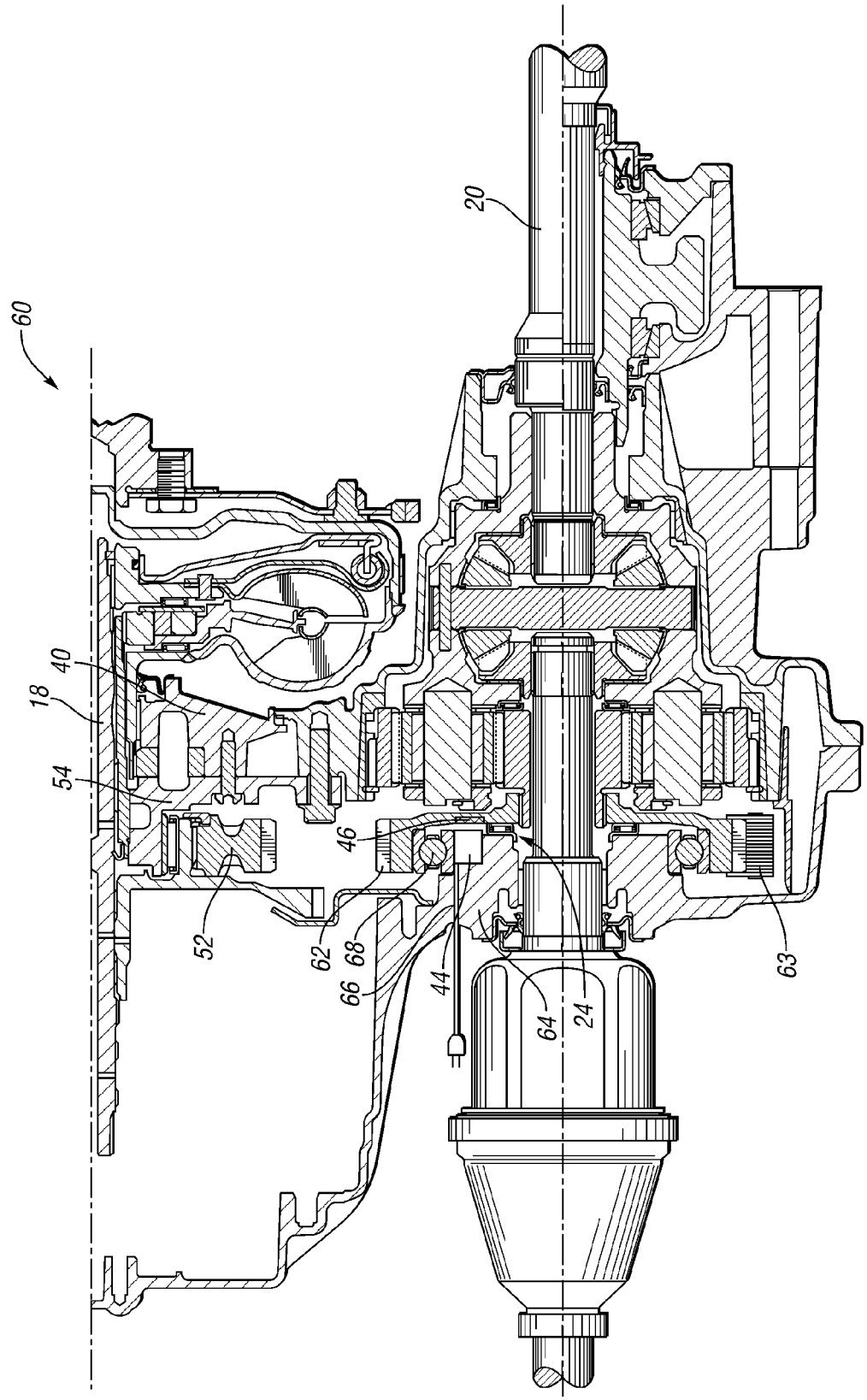
FIG. 5B illustrates a cross-sectional view of an automatic transmission having a sensor on chain driven sprocket design in accordance with a second variation of the first embodiment of the present invention.

Referring now to FIG. 5B, a cross-sectional view of an automatic transmission 60 having a sensor on chain driven sprocket design in accordance with a second variation of the first embodiment of the present invention is shown. Transmission 60 includes a chain driven sprocket 62 for driving an output shaft 20 of transmission 60. Transmission 60 further includes a sprocket bearing support 64 in conjunction with chain driven sprocket 62. Chain driven sprocket 62 is driven by a chain drive 63. One side of the sprocket hub of chain driven sprocket 62 includes a magnetized region 46 of a sensor 24. Magnetized region 46 is on an outer surface of chain driven sprocket 62 facing sprocket bearing support 64.

Sprocket bearing support 64 is modified such that sensor housing 44 of sensor 24 may be integrated therein as shown in FIG. 5B. The magnetic flux sensing element(s) within sensor housing 44 senses magnetized region 46 to thereby read the tangential stress in the sprocket hub. Wiring 66 of sensor 24 extends out from under a bearing 68 between chain driven sprocket 62 and sprocket bearing support 64.

Figure 6A:
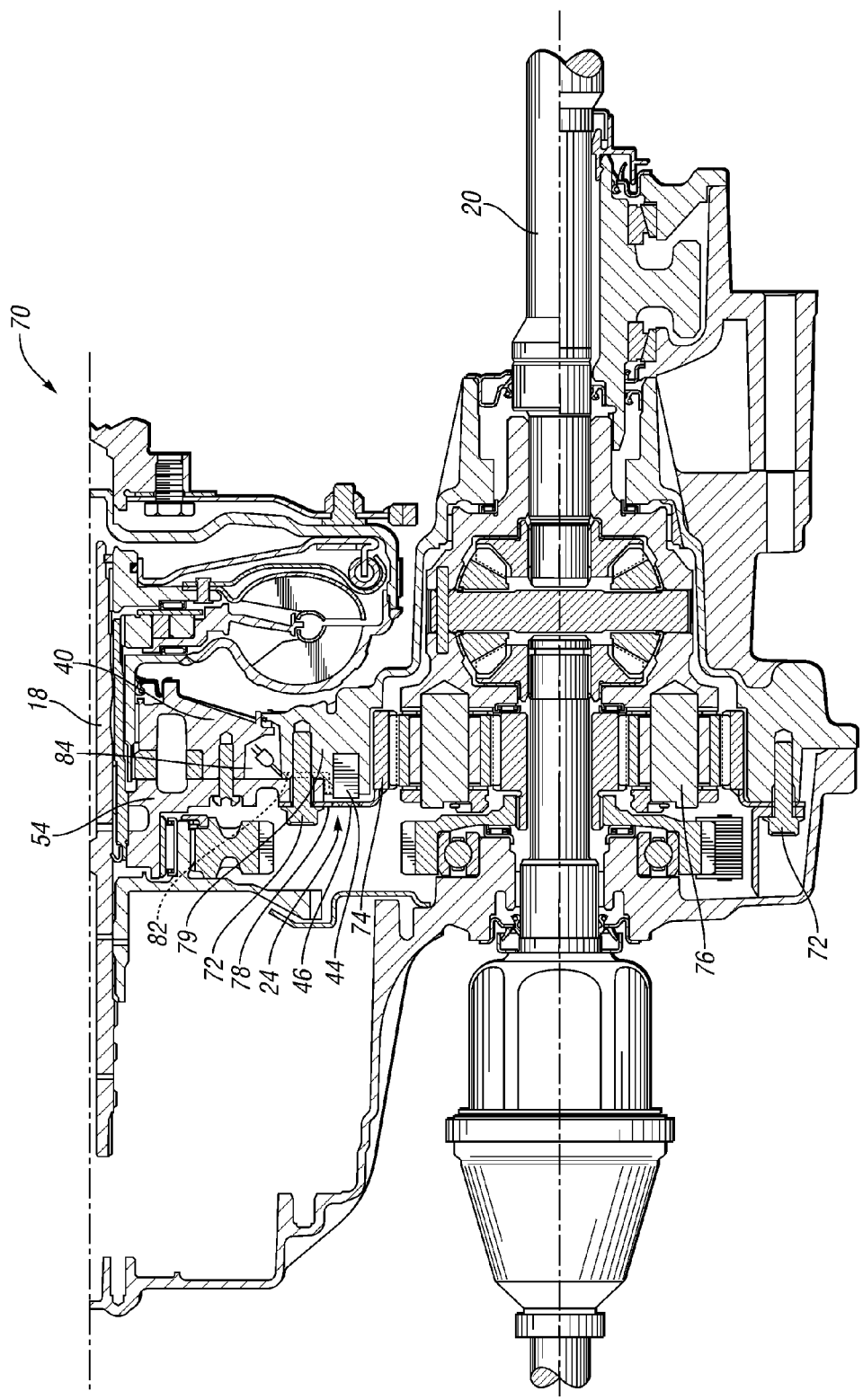
FIG. 6A illustrates a cross-sectional view of an automatic transmission having a sensor at the grounded ring gear of a final planetary drive design (radial configuration) in accordance with a first variation of a second embodiment of the present invention.

Referring now to FIG. 6A, a cross-sectional view of an automatic transmission 70 having a sensor at the grounded ring gear of a final planetary drive design (radial configuration) in accordance with a first variation of a second embodiment of the present invention is shown. Transmission 70 includes a final planetary drive 76 for driving an output shaft 20 of transmission 70. Final planetary drive 76 includes a ring gear 74. The ground location 72 of ring gear 74 is configured such that the ground path includes a magnetized region 46 of a sensor 24. Ring gear 74 includes a radial plate 78 welded thereon. Magnetized region 46 is on the surface of radial plate 78 of ring gear 74. Radial plate 78 is narrow to raise stress. Material of radial plate 78 may be removed to further raise stress. Sensor housing 44 of sensor 24 is embedded in a fixed housing part 79 of transmission 70 facing radial plate 78 of ring gear 74. The magnetic flux sensing element(s) within sensor housing 44 senses magnetized region 46 to thereby read the stress on radial plate 78 of ring gear 74. Wiring 82 of sensor 24 is routed into a cavity 84 between stator assembly 40, pump housing 54, and housing part 79 and out from transmission 70 at the top of housing part 79. In FIG. 6A, a front-wheel drive (FWD) version of transmission 70 is shown above centerline and an all-wheel drive (AWD) version of transmission 70 is shown below centerline.

Referring now to FIGS. 6B and 6C, cross-sectional and radial-sectional views of a modified version of ring gear 74 of final planetary drive 76 in accordance with the second embodiment of the present invention are shown. Ring gear 74 includes an inner part 75 and an outer part 77. Outer part 77 of ring gear 74 is grounded to the transmission case. Ring gear 74 includes a reduced region in the area of magnetized region 46.

Referring now to FIG. 6D, with continual reference to FIG. 6A, a cross-sectional view of an automatic transmission 90 having a sensor at the grounded ring gear of a final planetary drive design (axial configuration) in accordance with a second variation of the second embodiment of the present invention is shown. The ground location 72 of ring gear 74 of final planetary drive 76 is configured such that the ground path includes one or more magnetized regions 46 of a sensor 24. Ring gear 74 includes a cylindrical shell 92 welded thereon. Magnetized region 46 is on the surface of cylindrical shell 92 of ring gear 74. Cylindrical shell 92 is narrow to raise stress. Material of cylindrical shell 92 is removed as indicated at 94 to let chain drive 63 pass through. Sensor housing 44 of sensor 24 is embedded in a fixed housing part 96 of transmission 90 at the location of magnetized region 46. The magnetic flux sensing element(s) within sensor housing 44 senses magnetized region 46 to thereby read the stress on cylindrical shell 92 of ring gear 74. The ground location 72 can be realized by spline or bolt connection to housing part 96. Cylindrical shell 92 can function as an oil baffle plate at the bottom indicated at 98 to prevent oil accumulation around chain drive 63 and reduce the drag of chain drive 63. In FIG. 6D, a FWD version of transmission 90 is shown above centerline and an AWD version of transmission 90 is shown below centerline.

Figure 7A:
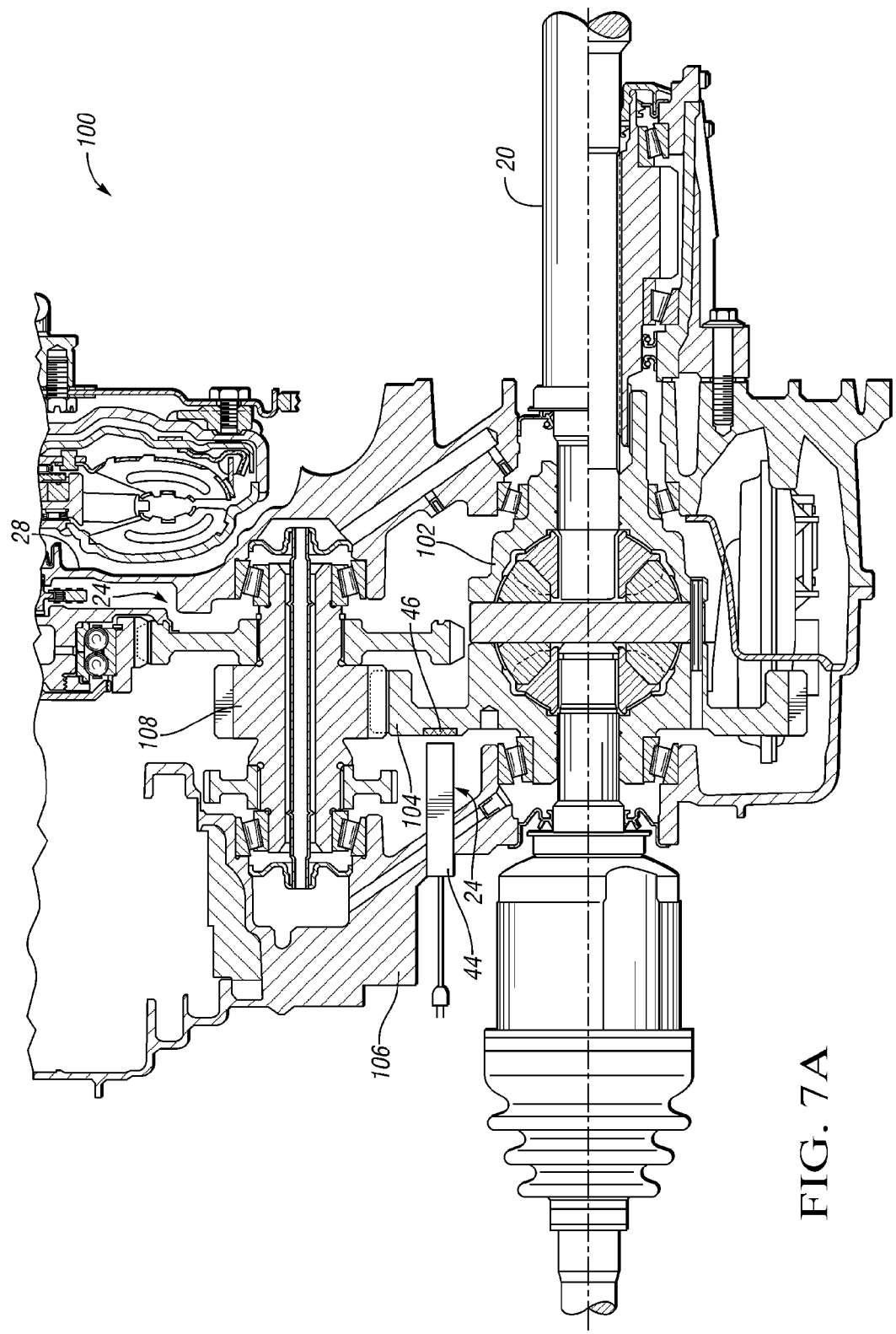
FIG. 7A illustrates a cross-sectional view of an automatic transmission having a sensor at the differential housing on the face of the final drive output gear design (final drive with idler shaft configuration) in accordance with a first variation of a third embodiment of the present invention.

Referring now to FIG. 7A, a cross-sectional view of an automatic transmission 100 having a sensor at the differential housing on the face of the final drive output gear design (final drive with idler shaft configuration) in accordance with a first variation of a third embodiment of the present invention is shown. Transmission 100 includes a unitary constructed differential housing 102 and final drive output gear 104. Differential housing 102 and final drive output gear 104 are configured to drive an output shaft 20 of transmission 100. Transmission 100 includes an idler shaft 108 in cooperation with final drive output gear 104. A face of final drive output gear 104 includes a magnetized region 46 of a sensor 24 thereon. Sensor housing 44 of sensor 24 is embedded in a fixed housing part 106 of transmission 100 at the location of magnetized region 46. The magnetic flux sensing element(s) within sensor housing 44 senses magnetized region 46 to thereby read the stress on final drive output gear 104.

Figure 7B:
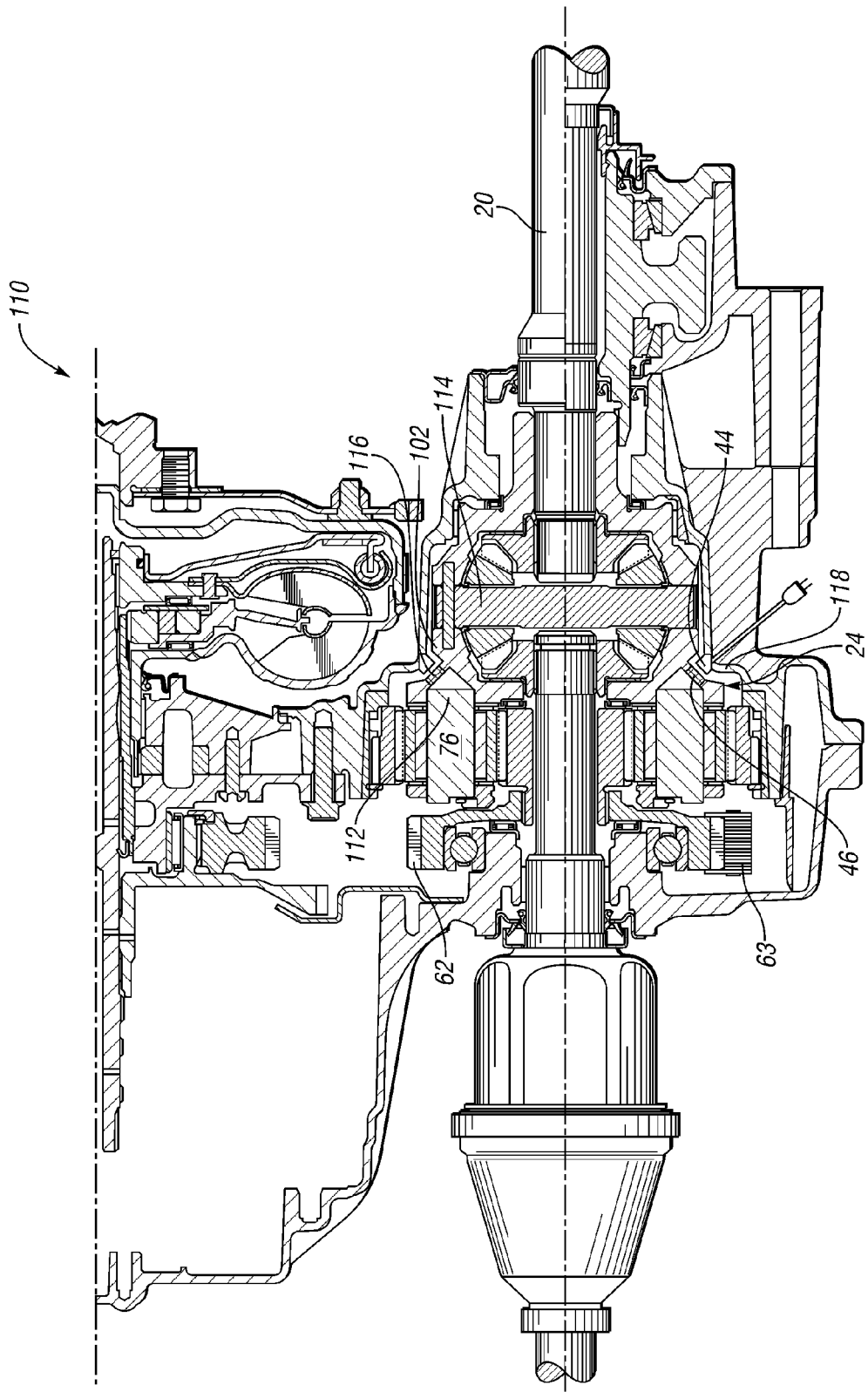
FIG. 7B illustrates a cross-sectional view of an automatic transmission having a sensor at the differential housing on a radial/angled area after final planetary drive design (final drive with chain and final planetary drive configuration) in accordance with a second variation of the third embodiment of the present invention.

Referring now to FIG. 7B, a cross-sectional view of an automatic transmission 110 having a sensor at the differential housing on a radial/angled area after final planetary drive design (final drive with chain and final planetary drive configuration) in accordance with a second variation of the third embodiment of the present invention is shown. Features of this design include material on differential housing 102 being modified such that a torque path between differential input load location 112 of final planetary drive 76 and the load at pinion 114 includes a narrow area 116. Narrow area 116 is narrowed as described to raise stress. Narrow area 116 can be radial, horizontal (cylindrical), or angled surface. Narrow area 116 is magnetized with a magnetized region 46. Sensor housing 44 of sensor 24 is embedded in a fixed housing part 118 of transmission 100 at the location of magnetized region 46. The magnetic flux sensing element(s) within sensor housing 44 senses magnetized region 46 to thereby read the stress on narrow area 116. In FIG. 7B, a FWD version of transmission 100 is shown above centerline and an AWD version of transmission 110 is shown below centerline.

Figure 8:
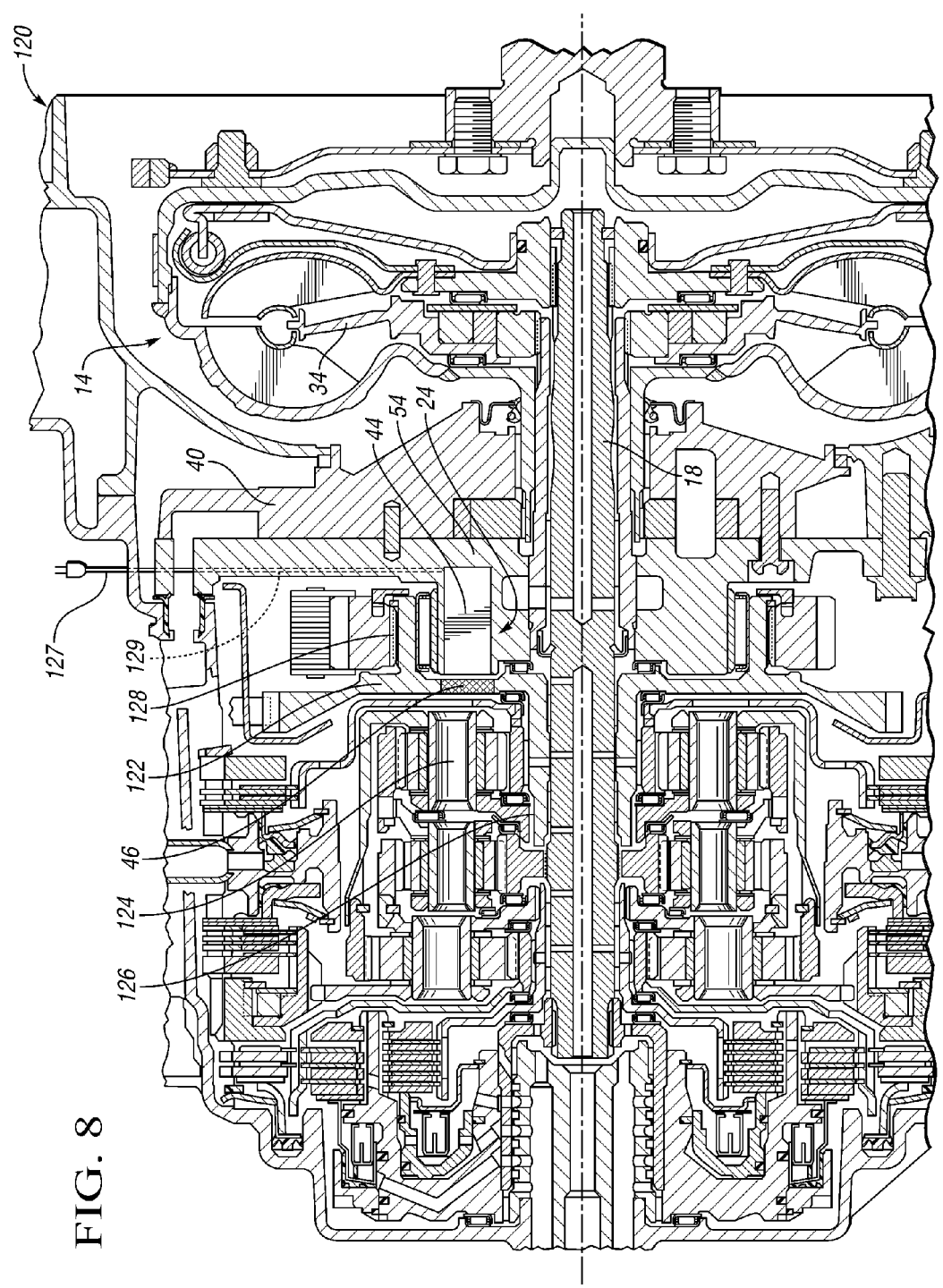
FIG. 8 illustrates a cross-sectional view of an automatic transmission having a sensor at the output planetary carrier hub/park gear design in accordance with a fourth embodiment of the present invention.

Referring now to FIG. 8, a cross-sectional view of an automatic transmission 120 having a sensor at the output planetary carrier hub/park gear design in accordance with a fourth embodiment of the present invention is shown. Features of this design include a carrier hub 122 of an output planetary 124 of transmission 120 having a magnetized region 46 of a sensor 24. Magnetized region 46 is on a face of output planetary carrier hub 122 and is between locations of load input 126 and load output 128 of carrier hub 122. Sensor housing 44 of sensor 24 is integrated into the portion of pump housing 54 at the location of magnetized region 46. The magnetic flux sensing element(s) within sensor housing 44 senses magnetized region 46 to thereby read the stress on output planetary carrier hub 122. Wiring 127 of sensor 24 extends through grooves 129 milled in the wall of pump housing 54.

Figure 9:
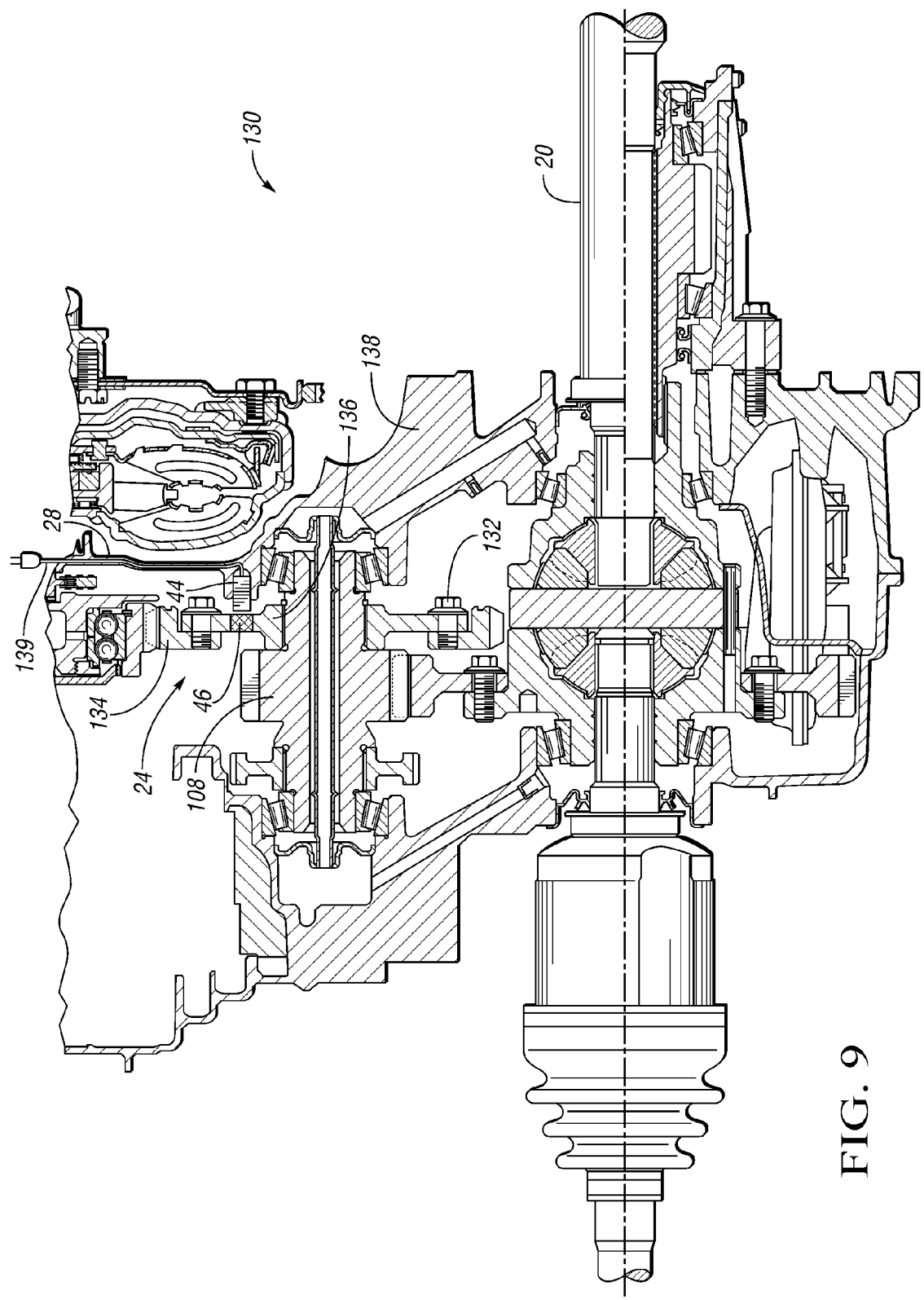
FIG. 9 illustrates a cross-sectional view of an automatic transmission having a sensor at a multi-piece transfer gear face design in accordance with a fifth embodiment of the present invention.

Referring now to FIG. 9, a cross-sectional view of an automatic transmission 130 having a sensor at a multi-piece transfer gear face design in accordance with a fifth embodiment of the present invention is shown. Transmission 130 has a multi-piece transfer gear face. The multi-piece transfer gear face has a multi-piece construction in which the transfer shaft input gear is composed of two pieces that are connected together by bolts 132: an outer part 134 with gear teeth on an outer diameter and an inner part 136 splined to transfer shaft 108 at the inner diameter of inner part 136. Inner part 136 has one or more heat treated and magnetized regions 46 on its face. The cross-section of inner part 136 may be reduced at magnetized region 46 to raise the stress level and magnetic signal strength for the magnetic sensing element(s) of a sensor 24. Sensor housing 44 of sensor 24 is embedded in a fixed housing part 138 of transmission 130 at the location of magnetized region 46. The magnetic flux sensing element(s) within sensor housing 44 senses magnetized region 46 to thereby read the stress on the transfer shaft input gear. Wiring 139 of sensor 24 is routed near and attached to the wall of housing part 138.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A transmission comprising:
   a final planetary drive, for driving an output shaft, having a ring gear with a radial plate connected thereto, the radial plate extending radially from the ring gear away from the output shaft with at least a portion of the radial plate extending radially past the ring gear, the portion of the radial plate extending radially past the ring gear including a magnetized region;
   a fixed housing part;
   a magnetic torque sensor mounted to a portion of the housing part facing the magnetized region to sense the magnetized region and thereby detect torque on the ring gear;
   a stator assembly; and
   a pump housing, wherein the pump housing and the stator assembly are interconnected;
   wherein wiring of the sensor is routed from the sensor into a cavity between the stator assembly, the pump housing, and the housing part.

2. A transmission comprising:
   a final planetary drive, for driving an output shaft, having a ring gear with a cylindrical shell connected thereto, the cylindrical shell extending axially from the ring gear relative to the output shaft and including a magnetized region extending axially relative to the output shaft;
   a fixed housing part;
   a magnetic torque sensor mounted to a portion of the housing part facing the magnetized region to sense the magnetized region and thereby detect torque of the ring gear;
   a stator assembly; and
   a pump housing, wherein the pump housing and the stator assembly are interconnected;
   wherein wiring of the sensor is routed from the sensor into a cavity between the stator assembly, the pump housing, and the housing part.

3. The transmission of claim 2 further comprising:
   a chain drive;
   the cylindrical shell is configured to enable the chain drive to pass therethrough and the chain drive passes through the cylindrical shell.

4. The transmission of claim 3 wherein:
   the cylindrical shell functions as an oil baffle plate to prevent oil accumulation around the chain drive and reduce drag of the chain drive.

5. A transmission comprising:
   a drive, for driving a shaft, having a ring gear with a cylindrical shell extending axially from the gear relative to the shaft, the shell including a magnetized region extending axially relative to the shaft;
   a sensor mounted to a housing part facing the magnetized region;
   an interconnected stator assembly and pump housing;
   wiring routed from the sensor into a cavity between the stator assembly, the pump housing, and the housing part.

* * * * *